(12) United States Patent
Himmelmann (10) Patent No.: US 8,418,721 B2
(45) Date of Patent: Apr. 16, 2013

(54) CONTROL SYSTEM FOR A VALVE ASSEMBLY

(75) Inventor: Richard A. Himmelmann, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 591 days.

(21) Appl. No.: 12/500,014

(22) Filed: Jul. 9, 2009

(65) Prior Publication Data

US 2011/0005600 A1 Jan. 13, 2011

(51) Int. Cl.
*F16K 11/065* (2006.01)

(52) U.S. Cl.
USPC .................. 137/625.48; 251/87; 251/232

(58) Field of Classification Search .................. 137/625, 137/625.29, 625.42, 625.45, 625.48; 251/87, 251/232; 236/34.5; 123/41.09, 41.1, 41.28, 123/41.29
See application file for complete search history.

(56) References Cited

U.S. PATENT DOCUMENTS

| | | | | |
|---|---|---|---|---|
| 3,664,376 A | * | 5/1972 | Watkins | 137/625.68 |
| 3,758,070 A | | 9/1973 | Zehr | |
| 3,763,891 A | * | 10/1973 | Stiltner | 137/625.18 |
| 3,977,433 A | * | 8/1976 | Hankison et al. | 137/625.29 |
| 4,054,261 A | | 10/1977 | Gilmore et al. | |
| 4,399,838 A | * | 8/1983 | Poujol | 137/625.29 |
| 4,469,133 A | * | 9/1984 | Boesing et al. | 137/625.29 |
| 4,483,509 A | | 11/1984 | Lewcock et al. | |
| 4,653,535 A | * | 3/1987 | Bergmann | 137/625.17 |
| 4,706,934 A | * | 11/1987 | Brown | 251/87 |
| 5,152,321 A | * | 10/1992 | Drager et al. | 137/625.29 |
| 6,349,412 B1 | | 2/2002 | Dean | |
| 6,575,195 B2 | * | 6/2003 | Wichmann | 137/625.17 |
| 6,610,122 B1 | | 8/2003 | Filburn et al. | |
| 6,681,589 B2 | | 1/2004 | Brudnicki | |
| 6,709,483 B1 | | 3/2004 | Hodgson, Jr. | |
| 7,044,795 B2 | | 5/2006 | Diep | |
| 7,139,639 B2 | | 11/2006 | Broussard et al. | |
| 7,261,127 B1 | * | 8/2007 | Oundjian | 137/625.5 |
| 7,309,057 B2 | | 12/2007 | Santiago | |

FOREIGN PATENT DOCUMENTS

EP 0240443 10/1987
WO WO 03060360 7/2003

OTHER PUBLICATIONS

Quick Disconnect Utilizing Guillotine Valves, U.S. Appl. No. 12/128,880.

* cited by examiner

*Primary Examiner* — John Fox
(74) *Attorney, Agent, or Firm* — Cantor Colburn LLP (57) ABSTRACT

A valve assembly (2) includes a valve body (4) having a first section (6) and a second section (8). The first section (6) includes an inlet member (12) and an outlet member (13) and the second section (8) includes an inlet element (28) and an outlet element (29). The valve assembly (2) also includes a control system (44) arranged between the first section (6) and the second section (8) of the valve body (4). The control system (44) includes a flow direction member (48) that is selectively shifted between one of a full through flow mode and a bypass mode. When in the full through flow mode the flow direction member (48) passes a complete fluid flow from the inlet member (12) to the outlet element (29) and from the inlet element (28) to the outlet member (13), and when in the bypass mode the flow direction member passes the fluid flow from the inlet member (12) to the outlet member (13).

18 Claims, 9 Drawing Sheets

FIG. 10 ns in which:

CONTROL SYSTEM FOR A VALVE ASSEMBLY

BACKGROUND OF THE INVENTION

The subject matter disclosed herein relates to the art of valve assemblies and, more particularly, to a control system for a valve assembly.

Valves are in wide use to control fluid flows employed in connection with temperature control applications. In general, ball type valves having manual or automating actuators are utilized to control fluid flow into and out of heat exchange relationship with a body/device in need of temperature control. In addition to ball-type valves, gate type valves have also been employed in temperature control applications. While effective, both ball-type valves and gate-type valves are large, bulky apparatus. The size of ball and gate type valves is particularly dis-advantageous in the art of closed environment suit applications, particularly suits that are suitable for use underwater and in space. In either application, temperature control valves must be compact in order to integrate into the suit without adding extra bulk that may interfere with an operator's ability to perform various tasks.

BRIEF DESCRIPTION OF THE INVENTION

According to one aspect of the invention, a valve assembly includes a valve body having a first section and a second section. The first section includes an inlet member and an outlet member and the second section includes an inlet element and an outlet element. The valve assembly also includes a control system arranged between the first section and the second section of the valve body. The control system includes a flow direction member that is selectively shifted between one of a full through flow mode and a bypass mode. When in the full through flow mode the flow direction member passes a complete fluid flow from the inlet member to the outlet element and from the inlet element to the outlet member, and when in the bypass mode the flow direction member passes the fluid flow from the inlet member to the outlet member.

According to another aspect of the invention, a method of controlling flow through a valve assembly having a valve body including a first section and a second section, the first section including an inlet member and an outlet member and the second section including an inlet element and an outlet element includes passing a fluid flow into the inlet member, selectively shifting a flow direction member into one of a full through flow mode and a bypass mode. When in the full through flow mode, all of the fluid flow passes through the flow direction member from the inlet member toward the outlet element and from the inlet element to the outlet member, and when in the bypass mode, all of the fluid flow passes through the flow direction member from the inlet member to the outlet member.

These and other advantages and features will become more apparent from the following description taken in conjunction with the drawings.

BRIEF DESCRIPTION OF THE DRAWING

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
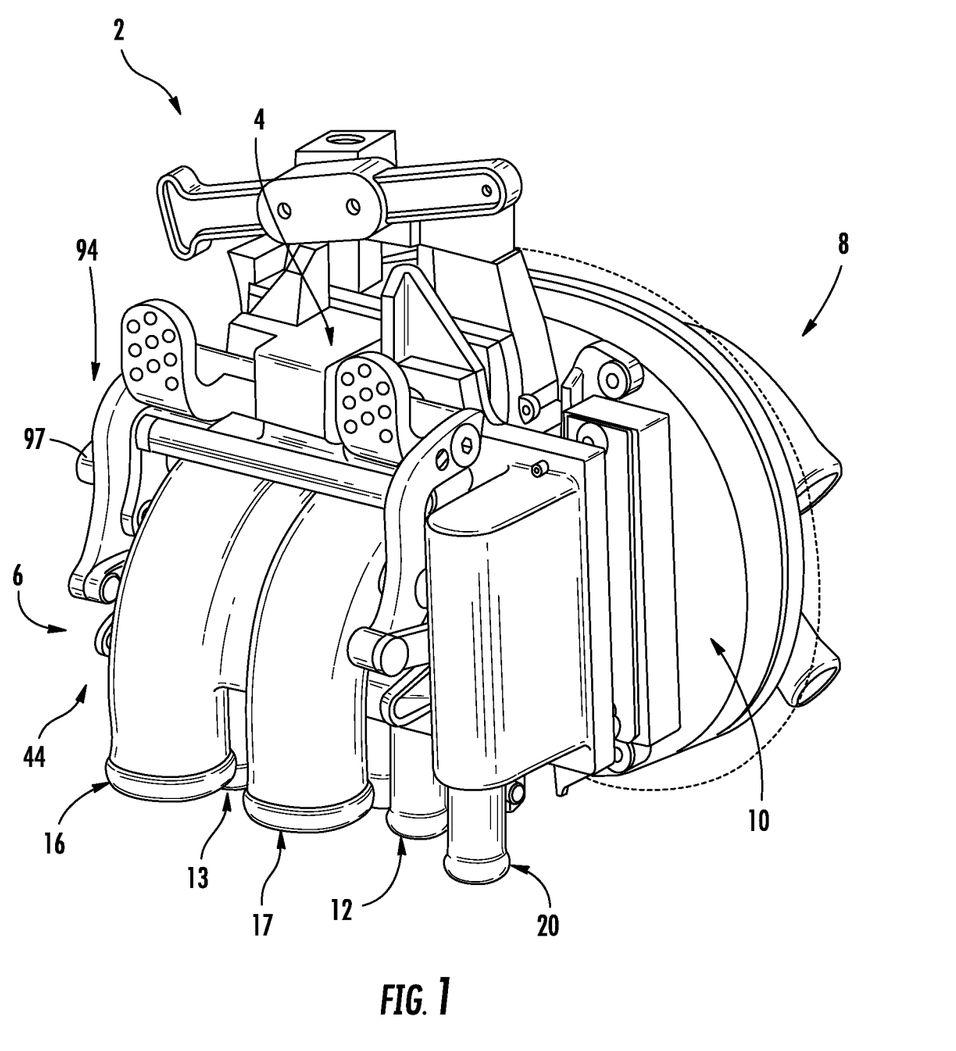
FIG. 1 is lower right perspective front view of a multi-ported valve assembly including a control system in accordance with an exemplary embodiment.
Figure 2:
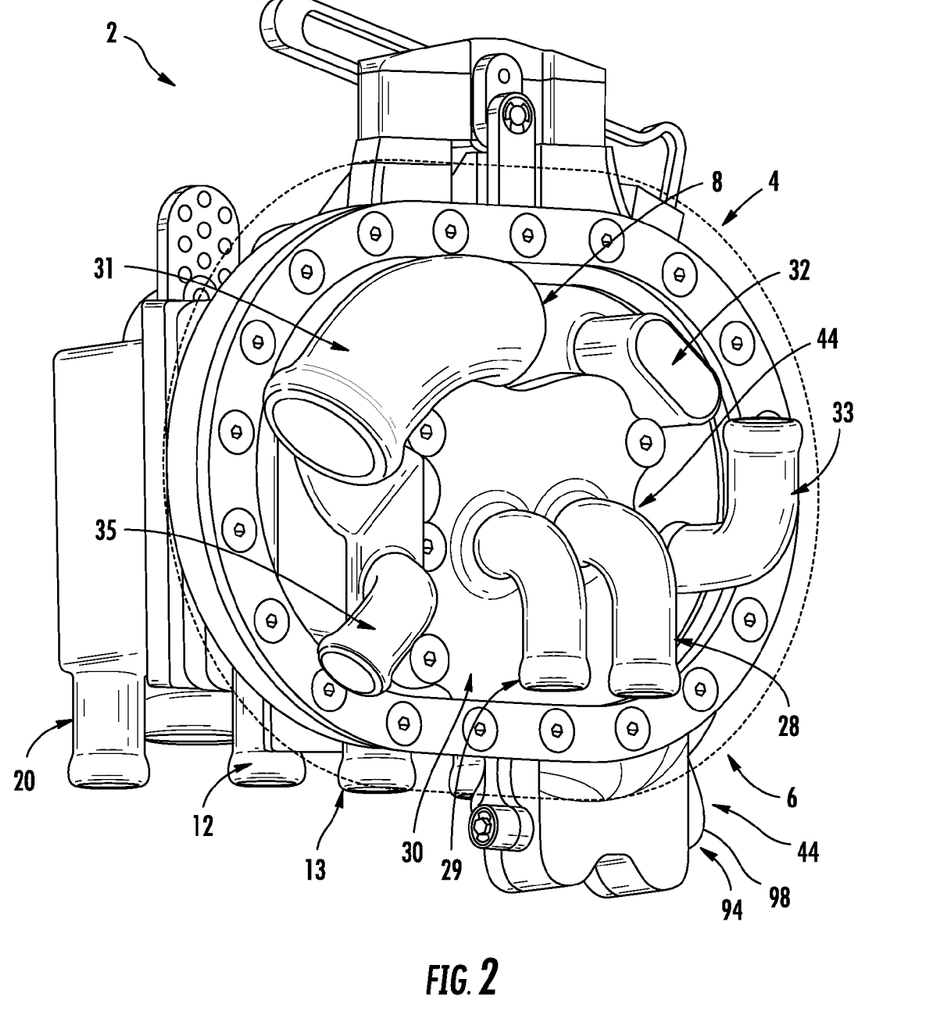
FIG. 2 is lower right perspective rear view of a multi-ported valve assembly including a control system in accordance with an exemplary embodiment

With reference to FIGS. 1-2, a valve assembly, shown in the form of a multi-ported quick disconnect valve, is indicated generally at 2. Quick disconnect valve 2 includes a valve body 4. As shown, valve body 4 includes a first section or connector 6, a second section or connector 8, and the third section or connector 10. First connector 6 includes a plurality of flow passages one of which defines an inlet member 12 and another that defines an outlet member 13. First connector 6 includes additional flow passages 16-17 as well as an electrical passage 20. Similarly, second connector 8 includes a plurality of flow passages, one of which defines an inlet element 28 and another that defines an outlet element 29. Inlet element 28 and outlet element 29 are arranged on a cover member 30. Second connector 8 includes additional flow passages 31-33 as well as an electrical passage 35. Liquid flow between first connector 6 and second connector 8 is controlled through selective positioning of a control system 44 in a manner that will be described more fully below.

Reference will now be made to FIGS. 3-10 in describing control system 44. As shown, control system 44 includes a flow direction member 48 arranged within a flow cavity 50. Flow direction member 48 includes a first substantially planar surface 52 that extends to a second substantially planar surface 53 through a body section 55. Flow direction member 48 is also shown to include a socket element 57 which, as will be discussed more fully below, aids in shifting control system 44 between various modes.

Figure 3:
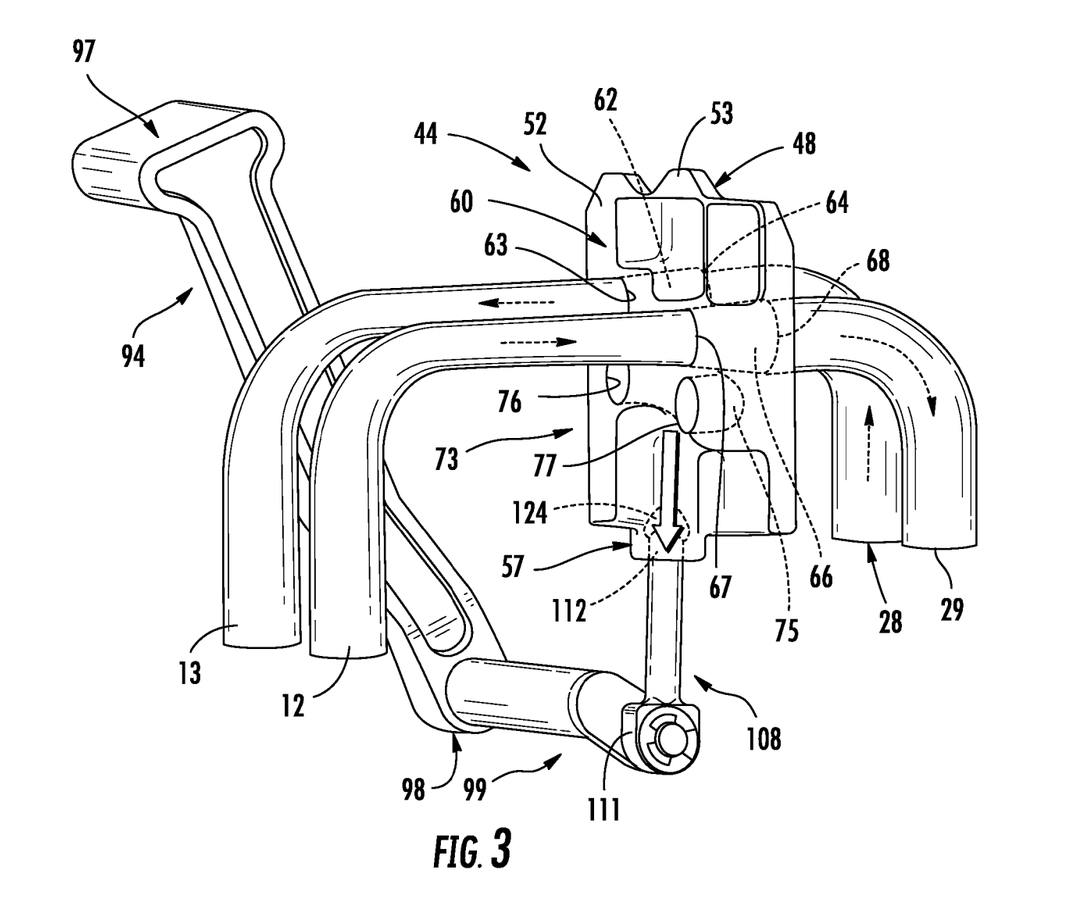
FIG. 3 is a schematic view of the control system in a first or full flow through mode.

In accordance with an exemplary embodiment, flow direction member 48 includes a through flow portion 60 having a first passage 62 including a first orifice 63 arranged in first substantially planar surface 52 and a second orifice 64 arranged in second substantially planar surface 53. Through flow portion 60 also includes a second passage 66 having a first orifice 67 arranged in first substantially planar surface 52 and a second orifice 68 arranged in second substantially surface 63. Referring to FIG. 3, fluid flowing into inlet member 12 passes through second passage 66 towards outlet element 29. The fluid then reenters inlet element 28, passes through first passage 62 and back through outlet member 13. With this arrangement, multi-ported quick disconnect valve 2 creates a fluid flow path that is selectively controlled by control system 44.

Figure 5:
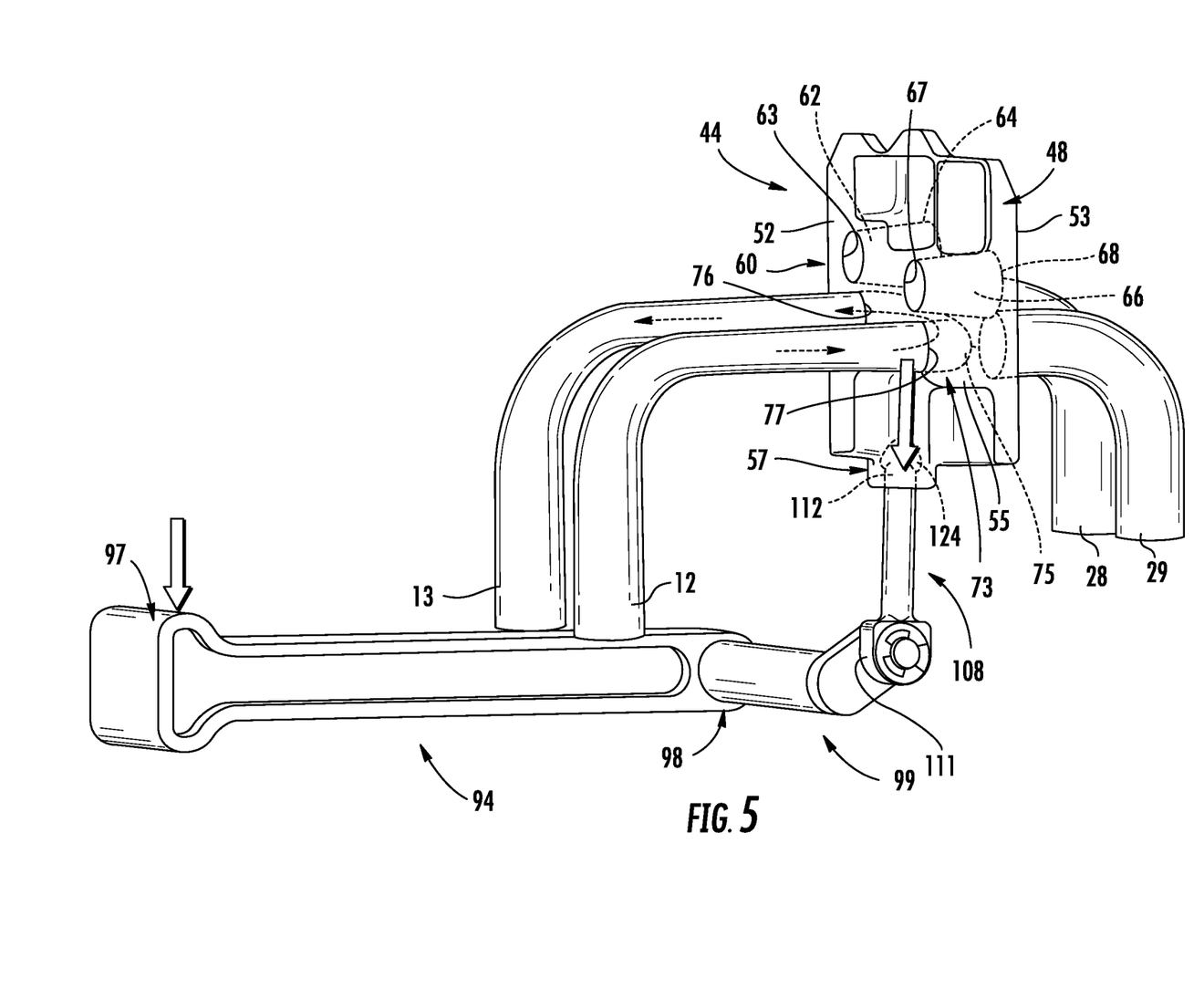
FIG. 5 is a is a schematic view of the control system in a third or full bypass flow mode.
Figure 6:
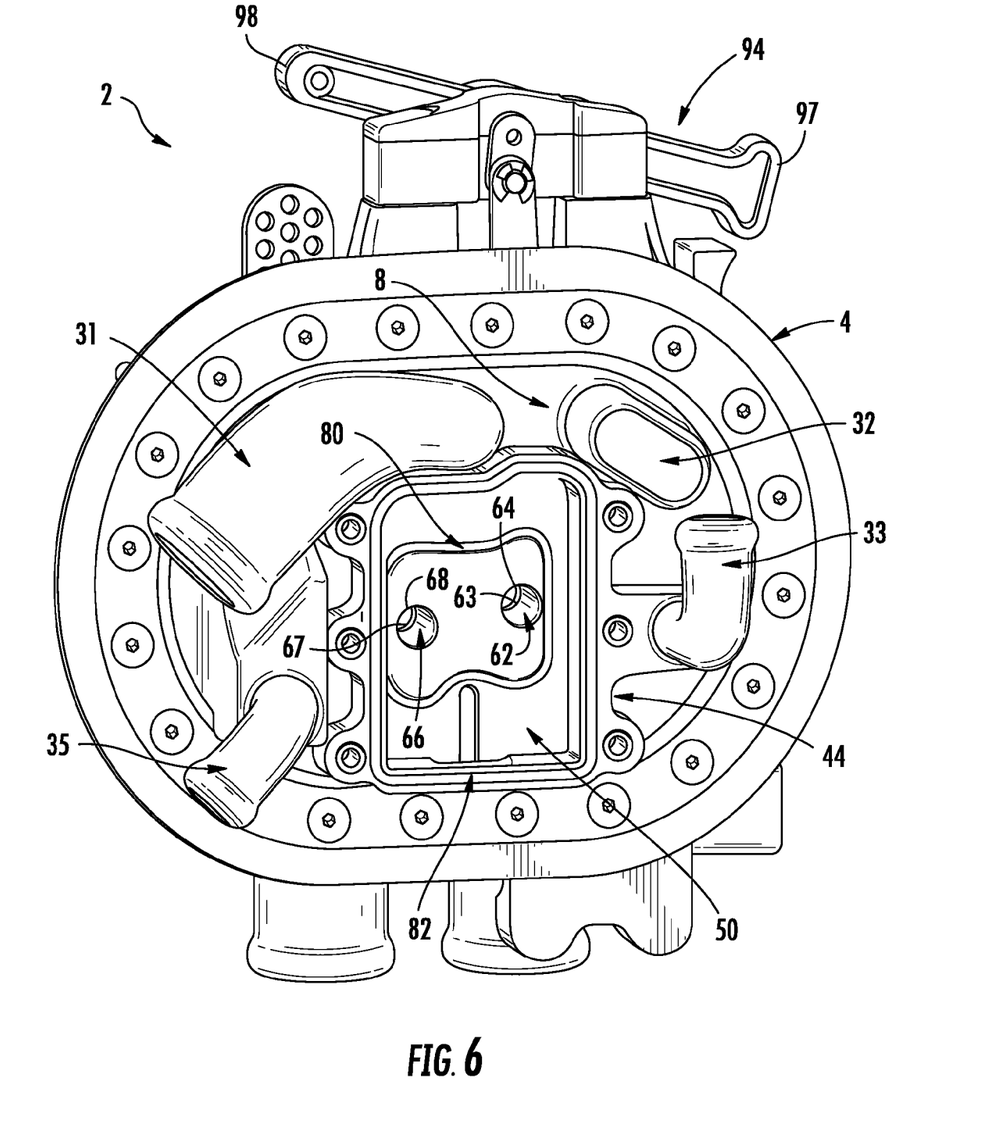
FIG. 6 is a rear elevational view of the multi-ported valve assembly of FIG. 1 illustrating a flow cavity of the control system.
Figure 7:
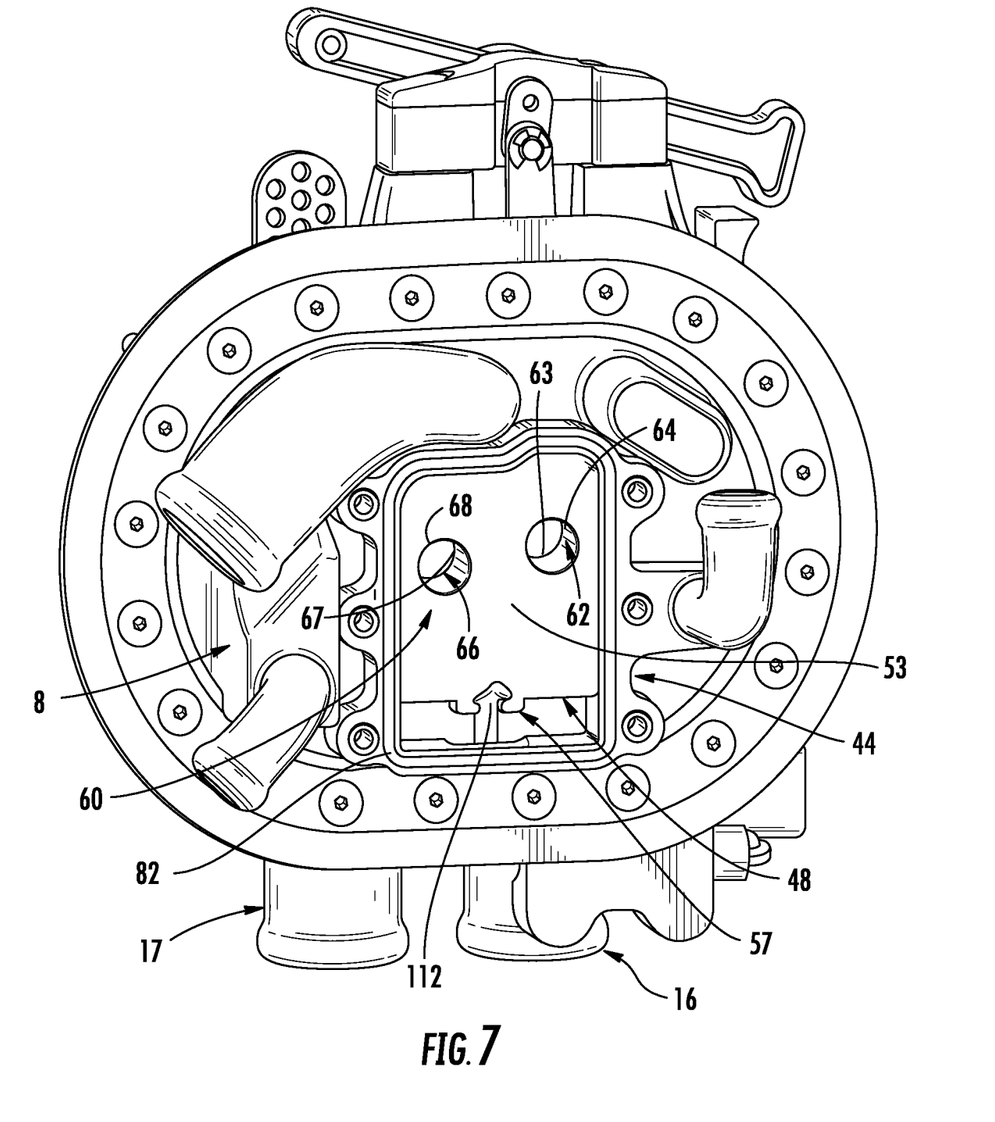
FIG. 7 is a rear elevational view of the multi-ported valve assembly of FIG. 1 illustrating a flow direction member portion arranged in the flow cavity of the control system.

In addition to through flow portion 60, flow direction member 48 is also shown to include a bypass portion 73 having a bypass conduit 75 including a first opening 76 arranged in first substantially planar surface 52 and a second opening 77 also arranged in first substantially planar surface 52. Referring to FIG. 5, fluid entering inlet member 12 passes into bypass portion 73 flows through bypass conduit 78 and back through outlet member 13. In this manner, multi-ported quick disconnect valve 2 isolates second connector 8 from the fluid flow. In order to assure that fluid flow passes through control system 44 without leaking from valve body 4, a gasket element 80 is positioned on an inner surface (not separately labeled) of flow cavity 50. Of course, an inner surface of cover 30 is also provided with a gasket (not shown). Still another gasket 82 is arranged on an outer edge portion of second connector 8 to provide sealing for cover 30.

Figure 4:
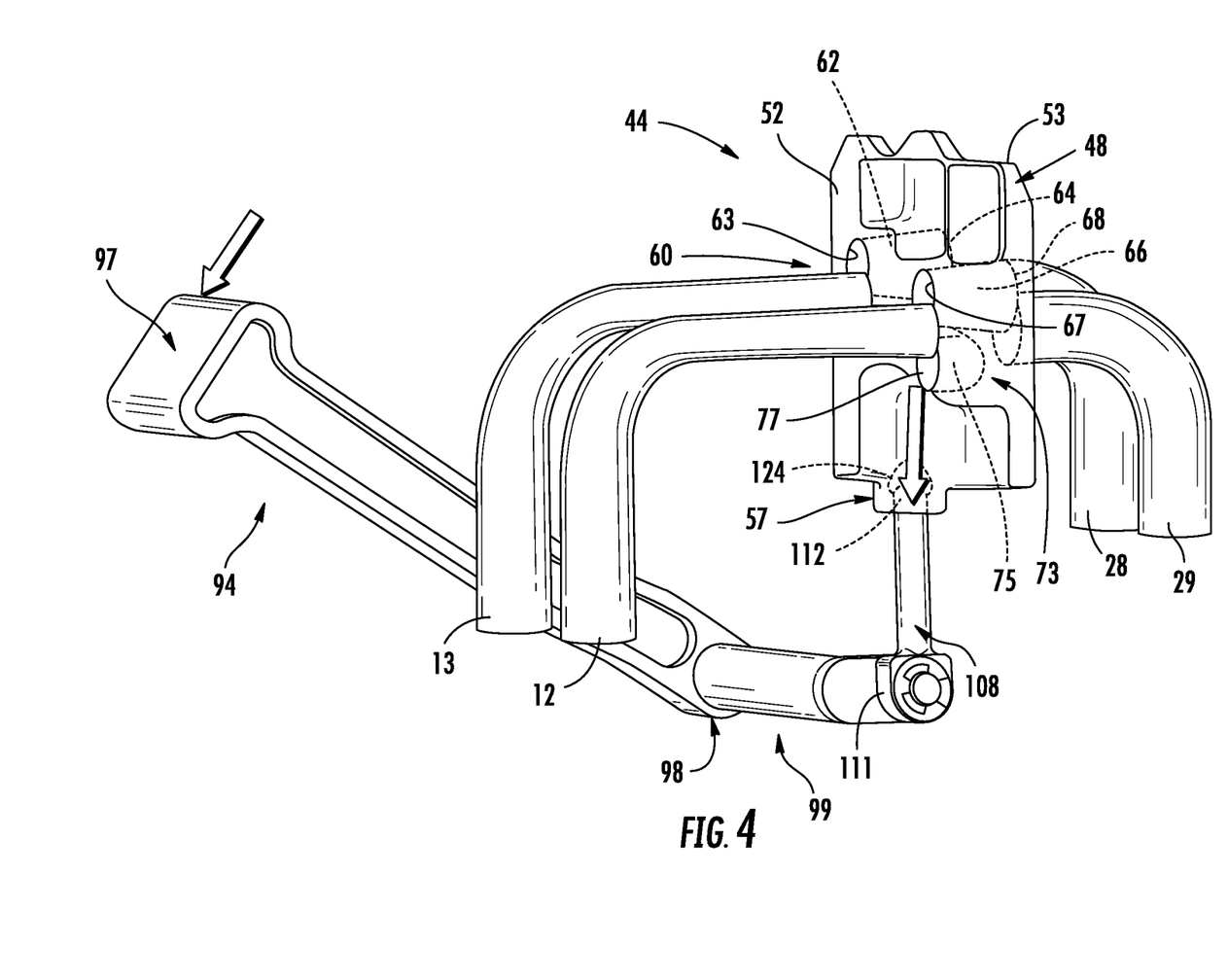
FIG. 4 is a schematic view of the control system in a second or partial bypass mode.
Figure 8:
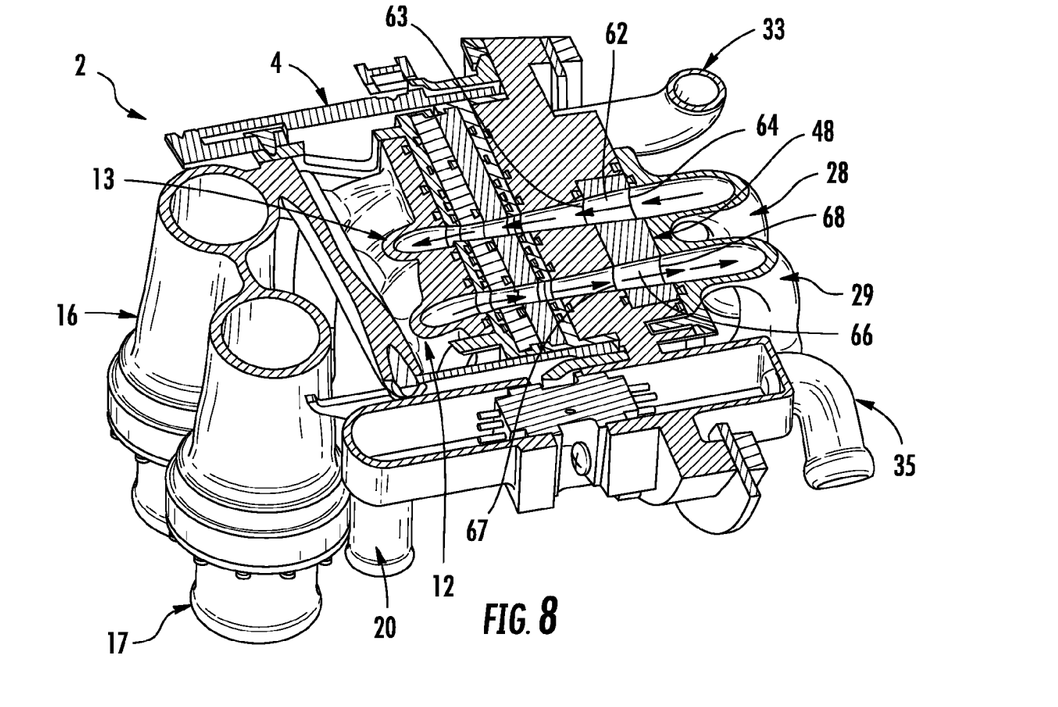
FIG. 8 is a partial cross-sectional view of the multi-ported valve assembly shown with the control system in the full through flow mode.
Figure 9:
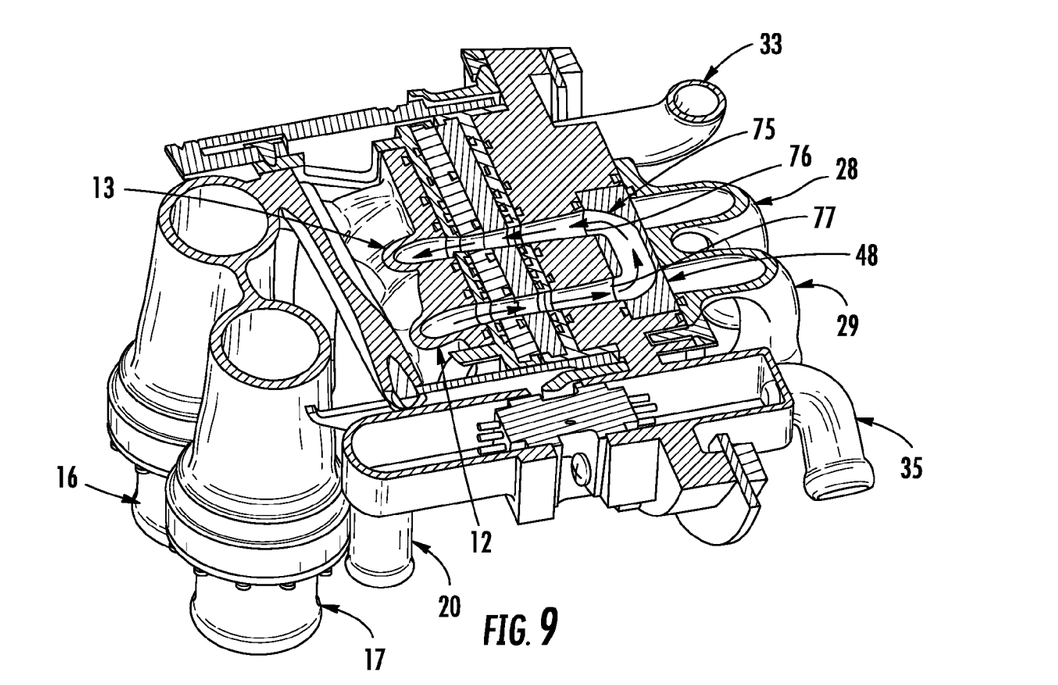
FIG. 9 is a partial cross-sectional view of the multi-ported valve assembly shown with the control system in the bypass mode.
Figure 10:
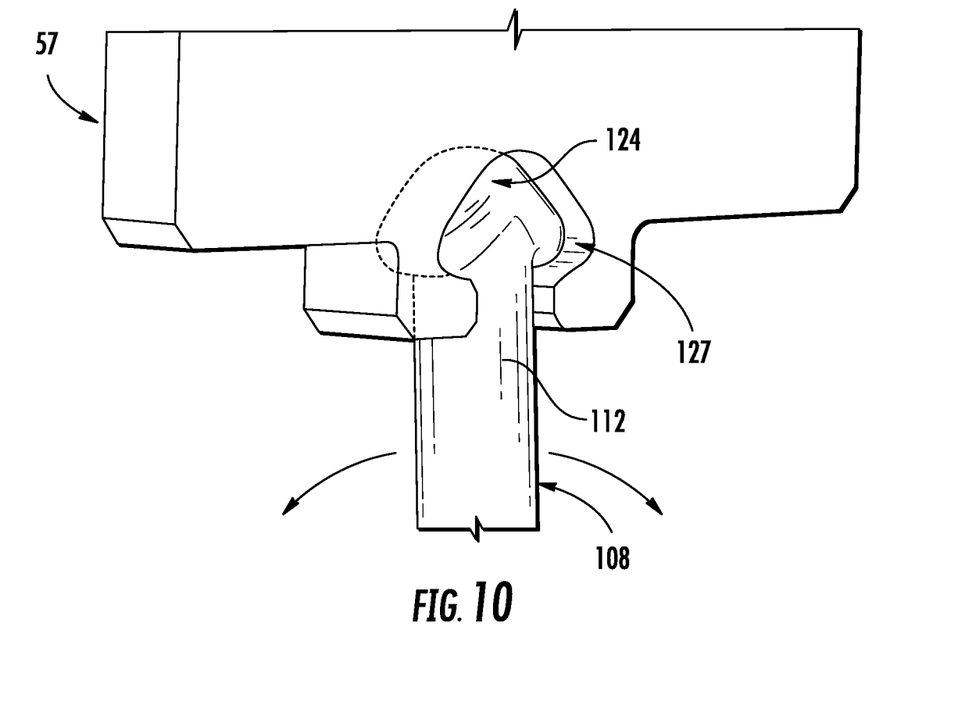
FIG. 10 is a perspective view of a connecting link portion of the control system.

In further accordance with an exemplary embodiments flow direction member 48 is shifted between a full through flow mode such as illustrated in FIGS. 3 and 8 to a partial bypass mode such as illustrated in FIG. 4 and full bypass mode such as illustrated in FIGS. 5 and 9 through manipulation of an actuation handle 94. As shown, actuation handle 94 includes a first end portion 97 that extends to a second end portion 98. Second end portion 98 includes a pivot member 99 that is operatively connected to flow direction member 48 through a connecting link 108. Connecting link 108 includes a first end section 111 operatively connected to pivot member 99 that extends to a second end section 112 provided with a pivoting element 124. (FIG. 10) Pivoting element 124 is received within pivoting element receiver 127 formed within socket element 57. With this arrangement, actuating handle 94 is selectively moved along an arcuate path to facilitate a shifting of flow direction member 48 with pivoting element 124 being capable of movement/rotation within socket element 57 to prevent binding. In the exemplary embodiment shown, flow direction member is shown shifting along a substantially linear path. However, it should be understood that flow direction member 48 can also be shifted along a tangential path through, for example, rotary movement. Rotary movement could be accomplished through, for example, a rotary handle, a handle including a gear, or a rack running against a gear.

In accordance with the exemplary embodiment, multi-ported quick disconnect 2 is be configured to have a thin form factor in order to minimize required space on, for example, a climate controlled suite such as used in space. In addition, by providing multiple passages through flow direction member 48, control system 44 can be readily shifted between a full through flow mode in order to provide a full flow of liquid through quick disconnect 2 to a partial bypass mode in order to minimize the amount of fluid flowing through quick disconnect 2 and a complete or full bypass mode in order to eliminate any flow through quick disconnect 2. In this manner, quick disconnect 2 can be readily employed to control, for example, temperature within the environmentally controlled suit.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A valve assembly comprising:
a valve body (4) including a first section (6) and a second section (8), the first section (6) including an inlet member (12) and an outlet member (13) and the second section (8) including an inlet element (28) and an outlet element (29); and
a control system (44) arranged between the first section (6) and the second section (8) of the valve body (4), the control system (44) including a flow direction member (48) having a through flow portion (60) including a first orifice (63) and a second orifice (64) and a bypass portion (73) including a first opening (76) fluidically connected to a second opening (77) through a bypass conduit (75) that is selectively shifted along a substantially linear path between one of a full through flow mode and a bypass mode, wherein in the full through flow mode the flow direction member (48) passes a complete fluid flow from the inlet member (12) through the first orifice (63) to the outlet element (29) and from the inlet element (28) through the second orifice (64) to the outlet member (13), and when in the bypass mode the flow direction member (48) passes the fluid flow from the inlet member (12) through the first opening (76) into the bypass conduit (75) to the second opening (74) and to the outlet member (13), wherein the flow direction member (48) is selectively positioned in a partial bypass mode when the flow direction member (48) passes a first portion of the fluid flow from the inlet member (12) to the outlet member (13) and a second portion of the fluid flow from the inlet member (12) to the outlet element (29).

2. The valve assembly (2) according to claim 1, wherein the flow direction member (48) includes a first substantially planar surface (52) that extends to a second substantially planer surface (53) through a body section (55).

3. The valve assembly (2) according to claim 2, wherein the flow direction member (48) includes a through flow portion (60) including first and second passages (62, 66), each of the first and second passages (62, 66) including a first orifice (63, 67) exposed at the first substantially planar surface (52) and a second orifice (64, 68) exposed at the second substantially planer surface (53).

4. The valve assembly (2) according to claim 3, wherein the flow direction member (48) includes a bypass portion (73) having a first opening (76) fluidly connected to a second opening (77) though a bypass conduit (75), each of the first and second openings (76, 77) being formed in the first substantially planer surface (52).

5. The valve assembly according to claim 4, further comprising: a plurality of gasket elements (80, 82), at least one of the plurality of gasket elements (80, 82) extending about each second orifice (64, 68) of the first and second passages (62, 66).

6. The valve assembly (2) according to claim 1, further comprising: an actuation handle (94) configured to selectively operate the control member (44), the actuation handle (94) including a first end portion (97) that extends to a second end portion (98) operatively coupled to the flow direction member (48) through a pivot member (99), the actuation handle (94) transforming a generally arcuate movement of the second end portion (98) to a substantially linear shifting of the flow direction member (48).

7. The valve assembly (2) according to claim 6, further comprising: a connecting (105) link having a first end section operatively coupled to the pivot member (99) and a second end section (112) operatively coupled to the flow direction member (48).

8. The valve assembly (2) according to claim 7, wherein the flow direction member (48) includes a socket element (57).

9. The valve assembly (2) according to claim 8, wherein the second end section (112) of the connecting link (108) includes a pivoting element (124), the pivoting element (124) being received by the socket element (57).

10. The valve assembly (2) according to claim 9, wherein the pivoting element (124) has a generally T-shaped cross-section.

11. A method of controlling flow through a valve assembly (2) having a valve body (4) including a first section (6) and a second section (8), the first section (6) including an inlet member (12) and an outlet member (13) and the second section (8) including an inlet element (28) and an outlet element (29), the method comprising:
   passing a fluid flow into the inlet member (12);
   selectively shifting a flow direction member (48) along a substantially linear path into one of a full through flow mode and a bypass mode,
   wherein when in the full through flow mode all of the fluid flow passes from the inlet member (12) through a first orifice (63) of a through flow portion (60) of the flow direction member (48) toward the outlet element (29) and from the inlet element (28) through a second orifice (64) of the through flow portion (60) to the outlet member (13),
   wherein when in the bypass mode all of the fluid flow passes from the inlet member (12) through a first opening (76) of a bypass portion (73) of the flow direction member (48) along a bypass conduit (75) of the bypass portion (73) to a second opening (74) of the bypass portion (73) to the outlet member (13); and
   selectively shifting the flow direction member 48 to a partial bypass mode wherein when in the partial bypass mode, a first portion of the fluid flow passed from the inlet member (12) to the outlet member (13) and a second portion of the fluid flow passes from the inlet member to (12) the outlet element (29).

12. The method of claim 11, wherein when in the full through flow mode, all of the fluid flow passes through first and second passages (62, 66) formed through the flow direction member (48).

13. The method of claim 11, wherein when in one of the bypass mode and the partial bypass mode, at least a portion of the fluid flow passes through a bypass conduit (75) formed within the flow direction member (48).

14. The method of claim 11, wherein when in one of the bypass mode and the partial bypass mode, at least a portion of the fluid flow passes into the inlet member (12) through the bypass conduit (75) to the outlet member (13), the inlet member (12) and outlet member (13) provided on a first side of the flow direction member (48).

15. The method of claim 11, wherein selectively shifting a flow direction member (48) along a substantially linear path includes shifting a first end portion (97) of an actuation handle (94) along a generally actuate path from a first position to a second position.

16. The method of claim 11, wherein selectively shifting flow direction member (48) includes shifting flow direction member (48) along a substantially linear path.

17. A valve assembly comprising:
   a valve body (4) including a first section (6) and a second section (8); and
   a control system (44) arranged between the first section (6) and the second section (8) of the valve body (4), the control system (44) including a flow direction member (48) having a through flow portion (60) including a first orifice (63) having a first center point defining a first centerline, a second orifice (64) having a second center point defining a second centerline, and a bypass portion (73) including a third centerline, the first and second center points defining a line establishing a first axis, and the third centerline establishing a second axis that is substantially parallel to the first axis, wherein the flow direction member is shiftable along a third axis that is perpendicular to the first and second axes.

18. The valve assembly according to claim 17, wherein the first section (6) including an inlet member (12) and an outlet member (13) and the second section (8) including an inlet element (28) and an outlet element (29), the flow direction member being configured and disposed to shift between one of a full through flow mode and a bypass mode, wherein in the full through flow mode the flow direction member (48) passes a complete fluid flow from the inlet member (12) through the first orifice (63) to the outlet element (29) and from the inlet element (28) through the second orifice (64) to the outlet member (13), and when in the bypass mode the flow direction member (48) passes the fluid flow from the inlet member (12) through the first opening (76) into the bypass conduit (75) to the second opening (74) and to the outlet member (13).

* * * * *